(12) United States Patent
Vlaar (10) Patent No.: US 12,016,456 B2
(45) Date of Patent: Jun. 25, 2024

(54) ACCESSORY SUPPORT DEVICE

(71) Applicant: VLAAR INNOVATIONS B.V., Midwoud (NL)

(72) Inventor: Erik Jacobus Vlaar, Midwoud (NL)

(73) Assignee: VLAAR INNOVATIONS B.V., Midwoud (NL)

( * ) Notice: Subject to any disclaimer, the term of this patent is extended or adjusted under 35 U.S.C. 154(b) by 0 days.

(21) Appl. No.: 17/996,428

(22) PCT Filed: May 11, 2021

(86) PCT No.: PCT/NL2021/000006
§ 371 (c)(1),
(2) Date: Oct. 17, 2022

(87) PCT Pub. No.: WO2021/242090
PCT Pub. Date: Dec. 2, 2021

(65) Prior Publication Data
US 2023/0200529 A1  Jun. 29, 2023

(30) Foreign Application Priority Data
May 25, 2020  (NL) .................................... 1043666

(51) Int. Cl.
*A47B 23/04* (2006.01)
*F16M 11/10* (2006.01)
(Continued)

(52) U.S. Cl.
CPC .......... *A47B 23/043* (2013.01); *F16M 11/10* (2013.01); *F16M 11/2035* (2013.01); *A47B 2023/049* (2013.01); *F16M 11/22* (2013.01)

(58) Field of Classification Search
CPC ..... A47B 23/043; A47B 23/044; A47B 23/04; A47B 23/00; A47B 97/04; A47B 97/08; F16M 11/10; F16M 11/2035; F16M 11/22
(Continued)

(56) References Cited

U.S. PATENT DOCUMENTS

| | | | | |
|---|---|---|---|---|
| 2,449,492 | A | * | 9/1948 | Long .................... A47B 23/043 248/447 |
| 4,848,243 | A | * | 7/1989 | Giordano ............. A47B 23/043 248/455 |

(Continued)

FOREIGN PATENT DOCUMENTS

| | | |
|---|---|---|
| KR | 101406384 B1 | 6/2014 |
| WO | 0206937 A1 | 1/2002 |

OTHER PUBLICATIONS

International Search Report and Written Opinion issued in PCT/NL2021/000006, dated Dec. 3, 2021.

*Primary Examiner* — Alfred J Wujciak
(74) *Attorney, Agent, or Firm* — HSML P.C.

(57) ABSTRACT

The disclosure relates to an accessory support device, comprising a support structure that defines a flat base plane. And comprising an inclined portion that is supported on the support structure that extends in an inclined plane upward relative to the base plane from a front of the accessory support device to a rear of the accessory support device. The accessory support device further comprises an upright portion that is supported on the support structure or on the inclined portion that extends in a mainly upright plane relative to the base plane from the rear of the accessory support device, so as to form a privacy panel that shields the user from being seen from the rear of the accessory support device. The upright portion and the inclined portion are angularly adjustably connected via an angle compensation (Continued)

device to compensate the upright portion for angular adjustment of the inclined portion.

16 Claims, 6 Drawing Sheets (51) Int. Cl.
*F16M 11/20* (2006.01)
*F16M 11/22* (2006.01)
(58) Field of Classification Search
USPC ....... 248/454, 455, 457, 458, 460, 462, 448, 248/449, 447, 441.1, 444
See application file for complete search history.

(56) References Cited

U.S. PATENT DOCUMENTS

| | | |
|---|---|---|
| 8,322,290 B1 | 12/2012 | Mignano |
| 10,485,335 B1 | 11/2019 | Johnson et al. |
| 11,297,941 B1* | 4/2022 | Hadar .................. A47B 23/043 |
| 2003/0223188 A1* | 12/2003 | Ha ..................... F16M 11/2021 |
| | | 361/679.06 |
| 2006/0201098 A1* | 9/2006 | Jung .................... F16M 11/105 |
| | | 52/653.1 |
| 2009/0289166 A1* | 11/2009 | Hopfer ................ A47B 23/043 |
| | | 248/456 |

* cited by examiner

ACCESSORY SUPPORT DEVICE

BACKGROUND

1. Technical Field

The disclosure relates to an accessory support device.

2. Description of Related Art

Prolonged sitting at a desk behind a computer/electronic device can lead to muscle strain, fatigue and stress. Still, experts in ergonomics say there are several easy and effective ways in which computer users can improve their physical comfort, fight fatigue, and reduce the risk of injuries.

Optimal ergonomics requires tailoring the work area to fit the user's needs.

Minor adjustments in spinal posture can quickly yield benefits. Even at home, but especially in a more stressful environment like an office, users may force their bodies into rigid positions that result in fatigue, muscle strain, and, potentially, injury.

Maintaining what experts call optimal ergonomic positioning can increase energy levels and improve overall comfort. Good posture keeps the spine in what health professionals call the neutral position. Achieving a neutral position while seated upright in a chair entails e.g. centering the weight of the head atop the spine. Sustaining this position can help reduce muscle strain and relieve pressure on the lower back.

To address the issue of stress, amongst others, more attention should be paid to personal privacy and well-being on the individual workplace. Among things necessary to accomplish better personal privacy is to create privacy by offering space division, e.g. with the help of privacy screens, that helps address visual distractions and improves productivity.

Mounting of privacy screens often conflicts with mounting of flat panel monitor arms due to form factor impracticalities. This combination is further frustrated in that it can lead to a shortage of desktop depth necessary for optimal viewing distances for computer users. Due to the rise of office costs per square meter, desktops are getting increasingly smaller, most notably less deep. Meanwhile, privacy screens are getting thicker to absorb ambient noise and flat panel monitor arms are getting larger to include more functionality, especially flat panel monitor arms equipped with bars to facilitate two or even three monitors or flat panel monitor arms with mounted laptop holders.

Previous attempts have been made to design and develop privacy screens and flat panel monitor arms separately. However, these attempts have either failed to do so providing the optimal viewing distances due to form factor impracticalities, or to adequately adjust to accommodate different sized users, or required considerable effort to change the configuration and settings of all these screens and arms collectively or to assemble these screens and arms. Also, these attempts have either failed to do so exactly where personal privacy is needed, or required considerable amounts of raw materials collectively to work properly. For the foregoing reasons, there is a need for a device, with a particular sleek form factor, creating personal privacy for users sitting upright and that facilitates height across a range sufficient to accommodate different-sized users. This device should elevate documents, mobile devices, laptop computers, and flat panel monitors preferably in line, and when adjustable also preferably in sync, all with the optimal viewing distances incorporated.

SUMMARY

The present disclosure aims to alleviate the disadvantages of the prior art. Thereto, the present disclosure provides for an accessory support device, comprising a support structure that defines a flat base plane; an inclined portion that is supported on the support structure and that has an inclined portion width and that extends in an inclined plane upward relative to the base plane along an inclined portion length from a front of the accessory support device facing a user to a rear of the accessory support device located further away from the user, the inclined portion including an accessory support surface extending at a first viewing angle for the user; and an upright portion that is supported on the support structure or on the inclined portion and that has an upright portion width and that extends in a mainly upright plane relative to the base plane along an upright portion length from the rear of the accessory support device at a second, greater viewing angle for the user, so as to form a privacy panel that shields the user from being seen from the rear of the accessory support device; wherein the upright portion is angularly adjustably connected to the inclined portion, optionally to the base portion or other portion of the support structure, preferably via a first hinge construction; wherein the inclined portion is angularly adjustably connected to the base portion or other portion of the support structure, preferably via a second hinge construction; wherein the first and second hinge constructions are coupled via an angle compensation device, optionally a parallelogram mechanism, to compensate the first hinge construction for angular adjustment of the second hinge construction so as to keep the angle of the upright portion relative to the base plane mainly unchanged when the angle of the inclined portion relative to the base plane is adjusted.

This type of construction facilitates height across a range sufficient to accommodate different-sized users. And this type of construction elevates documents, mobile devices, laptop computers, and flat panel monitors in line.

This type of construction elevates documents, mobile devices, laptop computers, and flat panel monitors in sync, all with the optimal viewing distances incorporated.

Preferably, the accessory support device may be a desktop accessory support device, including a support structure that is to be supported on a desktop of a user.

Advantageously, the accessory support device may be made of a single piece and from a single material, e.g. by means of bending or extruding highly sustainable (recycled) aluminum. There may be different sizes of the accessory support device to accommodate different sized users. Bending sheets of aluminum or extruding aluminum allows for a particular sleek form factor. The upright portion may be as thin as 3 mm. This allows for incorporating optimal viewing distances even in case of a shortage of desktop depth necessary for those optimal viewing distances for computer users. Devices made of a single piece don't need configuration, there are no settings and there's no assembly. From design, development, mold fabrication, manufacturing all the way to the user, everyone benefits from this type of construction. Sustainability is easily well served.

The accessory support surface may be configured to support standard A4 or Legal sized office paper in portrait orientation as well as a laptop (base) and e.g. a cell phone or tablet. A mainly upright plane may be between −30 degrees (i.e. away from a user) and +10 degrees (i.e. towards a user)

relative to a plane perpendicular on the base plane, in particular between −20 degrees and +5 degrees. The upright portion width may be substantially wider than the inclined portion width, e.g. at least 1.5 times, 2 times, or more times wider. The privacy panel may itself be prepared to carry lightweight add-ons like e.g. felt privacy panel extenders.

Within this context, the upright portion length may at least corresponds to the inclined portion length and the upright portion width may at least corresponds to the inclined portion width.

Preferably, the upright portion comprises a connector portion arranged to support a flat panel monitor, preferably via connector elements provided at the upright portion. The flat panel monitor is carried on the side of the upright portion facing the user. The connector portion may have one or more (slotted) holes, or one or more (horizontally) undercut blind (slots), e.g. advantageously in a VESA pattern, to facilitate securing the flat panel monitor on the upright portion.

A connector member may be used to connect to the connector elements, wherein the connector member comprises a fastener to secure the flat panel monitor on the upright portion. The fastener may define a head and a body, the head of the fastener to slidingly engage the upright portion, and the body of the fastener may define a main portion and a threaded end, the main portion to serve as a spacer and the threaded end to threadingly engage the flat panel monitor.

In accordance with the present disclosure, the upright portion may have an upright member having an upright member length and width respectively that is substantially less than the inclined portion length and width respectively. And the upright portion carries a flat panel monitor having a flat panel monitor length and width respectively such that the upright member and the flat panel monitor carried thereon together form a privacy panel having a privacy panel length and width respectively that at least corresponds to half of the inclined portion length and width respectively, optionally at least to the inclined portion length and width respectively. This favorable construction may save considerable amounts of raw materials.

Advantageously, the inclined portion length and width respectively, and in particular a length and width respectively of the accessory support surface, may at least correspond to the length and width respectively of a sheet of standard A4 or Legal sized office paper in portrait orientation.

Elegantly, the inclined portion, and in particular the accessory support surface thereof, may include a ledge portion extending transversely to the accessory support surface near the front of the accessory support device to stop an accessory supported on the inclined portion, in particular on the accessory support surface thereof, from sliding down.

In a particularly cost effective embodiment, the support structure may include a planar base portion that has a base portion width and that extends along a base portion length from the rear of the accessory support device to the front of the accessory support device.

Elegantly, the support structure may be provided with a central opening at the front of the accessory support device that provides access to a storage area located underneath the inclined portion facilitating keyboard clearance and storage for keyboard, cell phone and tablet and e.g. documents. The base portion may include legs at the sides with an interspace therebetween to facilitate easy sliding in.

In accordance with the present disclosure, the upright portion may be angularly adjustably connected to the inclined portion, optionally to the base portion or other portion of the support structure, preferably via a first hinge construction about a first hinge construction axis extending along a longitudinal axis of the first hinge construction and the inclined portion may be angularly adjustably connected to the base portion or other portion of the support structure, preferably via a second hinge construction about a second hinge construction axis extending along a longitudinal axis of the second hinge construction and the first hinge construction axis may extend in parallel to the second hinge construction axis. This type of construction facilitates height across a range sufficient to accommodate different-sized users. And this type of construction elevates documents, mobile devices, laptop computers, and flat panel monitors in line.

Advantageously, the first and second hinge constructions may be coupled via an angle compensation device, optionally a parallelogram mechanism, to compensate the first hinge construction for angular adjustment of the second hinge construction so as to keep the angle of the upright portion relative to the base plane mainly unchanged when the angle of the inclined portion relative to the base plane is adjusted. This type of construction elevates documents, mobile devices, laptop computers, and flat panel monitors in sync, all with the optimal viewing distances incorporated.

Elegantly, the upright portion may be angularly adjustable relative to the base plane independently from angular adjustment of the inclined portion relative to the base plane.

In accordance with the present disclosure, a balancing force device acting between the base portion or other portion of the support structure and the inclined portion may be used. The balancing force device may be a gas lift or a spring, or a more compact solution like e.g. a positioning hinge utilizing friction forces and torsion spring forces.

And in accordance with the present disclosure, the inclined portion may include a movable part, the movable part optionally including at least a part of the accessory support surface, and the movable part optionally being connected to the inclined portion via a third hinge construction so as to be independently angularly adjustable relative to the inclined portion. This movable part can be used to further improve the optimal viewing distances and angles. This movable part can be used to facilitate documents e.g. when more than one document needs to be read by a user. This movable part can also be used to facilitate a laptop computer e.g. when a laptop computer is being used on a first accessory support device together with a flat panel monitor on a second accessory support device and when a user elegantly likes to keep both privacy panels horizontally aligned. To reach an optimal viewing situation, the laptop screen is preferably horizontally aligned with the flat panel monitor (e.g. with their screen bottoms or tops). This requires the additional movable part.

The hinge constructions e.g. comprise positioning hinges which e.g. comprise constant friction means which allow to create a threshold for symmetric counterbalancing to offset gravity. Additionally, the hinge constructions e.g. comprise positioning hinges which e.g. comprise constant friction means and coiled torsion springs which allow to create a threshold for asymmetric counterbalancing to offset gravity. Advantageously, the hinge constructions comprise hinge members with means for preventing the rotation of the hinge members, e.g. circumferential knurled surfaces and means for correct positioning, e.g. flats, in the hinge constructions.

BRIEF DESCRIPTION OF THE DRAWINGS

The present disclosure will be further elucidated on the basis of an exemplary embodiment which is represented in a drawing. In the drawings.

It is noted that the figures are merely schematic representations of a preferred embodiment of the present disclosure, which is given here by way of non-limiting exemplary embodiment. In the description, the same or similar part and elements have the same or similar reference signs.

DETAILED DESCRIPTION OF THE EMBODIMENTS

Figure 1:
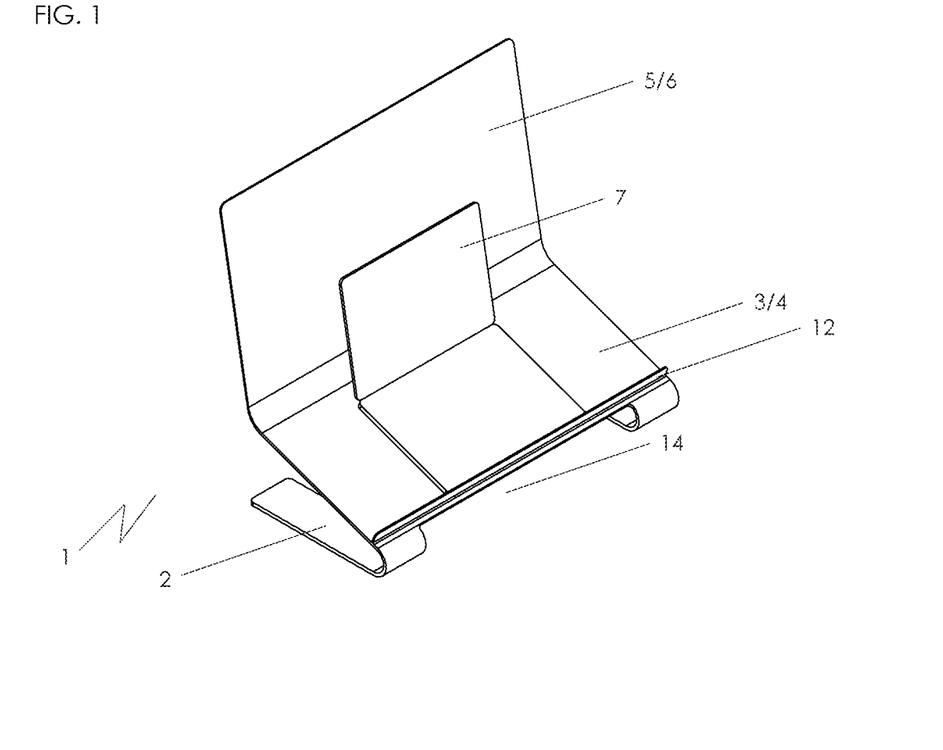
FIG. 1 shows a schematic perspective view of a first embodiment of an accessory support device according to the present disclosure.

FIG. 1 shows a first embodiment of an accessory support device 1 in accordance with the present disclosure. The accessory support device 1, comprising:

a support structure 2 that defines a flat base plane; an inclined portion 3 that is supported on the support structure 2 and that has an inclined portion width and that extends in an inclined plane upward relative to the base plane along an inclined portion length from a front of the accessory support device 1 facing a user to a rear of the accessory support device 1 located further away from the user, the inclined portion 3 including an accessory support surface 4 extending at a first viewing angle for the user; and an upright portion 5 that is supported on the support structure 2 or on the inclined portion 3 and that has an upright portion width and that extends in a mainly upright plane relative to the base plane along an upright portion length from the rear of the accessory support device 1 at a second viewing angle for the user, so as to form a privacy panel 6 that shields the user from being seen from the rear of the accessory support device 1. The support structure 2 may be held on a desk, the inclined portion 3 may carry a laptop computer 7, or the upright portion 5 may carry privacy panel extenders. The inclined portion 3, and in particular the accessory support surface 4 thereof, includes a ledge portion 12 extending transversely to the accessory support surface 4 near the front of the accessory support device 1 to stop an accessory supported on the inclined portion 3, in particular on the accessory support surface thereof 4, from sliding down. The support structure 2 is provided with a central opening 14 at the front of the accessory support device 1 that provides access to a storage area located underneath the inclined portion 3.

Figure 2:
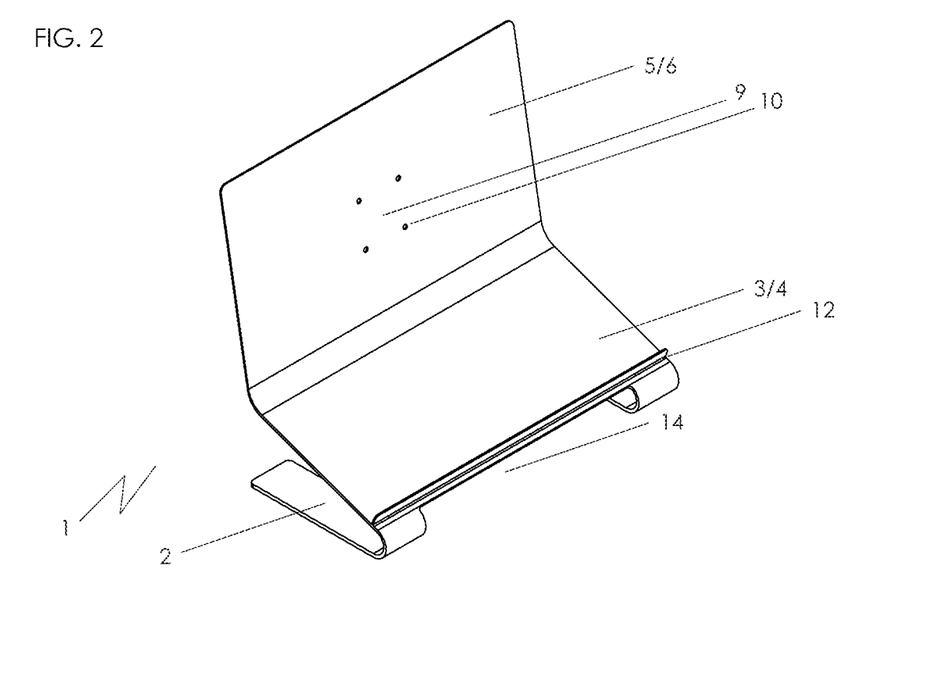
FIG. 2 shows a schematic perspective view of a second embodiment of an accessory support device according to the present disclosure.

FIG. 2 shows a second embodiment of an accessory support device 1 in accordance with the present disclosure. The accessory support device 1, wherein the upright portion 5 comprises a connector portion 9 arranged to support a flat panel monitor 8, preferably via connector elements provided at the upright portion 5. The connector portion 9 may consist of a set of holes 10 spaced in a VESA pattern.

Figure 3:
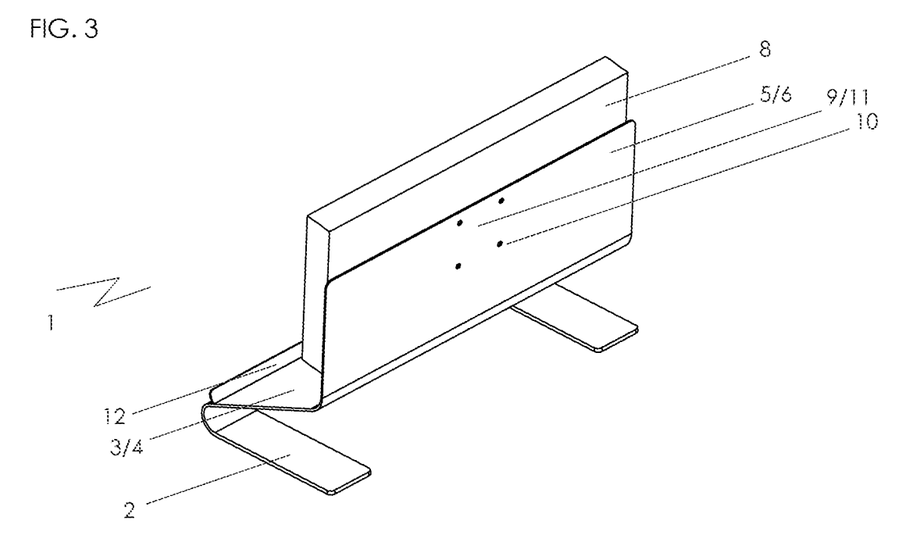
FIG. 3 shows a schematic perspective view of a third embodiment of an accessory support device according to the present disclosure.

FIG. 3 shows a third embodiment of an accessory support device 1 in accordance with the present disclosure. The accessory support device 1, wherein the upright portion 5 comprises an upright member 11 having an upright member length that is substantially less than the inclined portion length, and wherein the upright portion 5 carries a flat panel monitor 8 having a flat panel monitor length such that the upright member 11 and the flat panel monitor 8 carried thereon together form a privacy panel 6 having a privacy panel length that at least corresponds to half of the inclined portion length, optionally at least to the inclined portion length.

Figure 4:
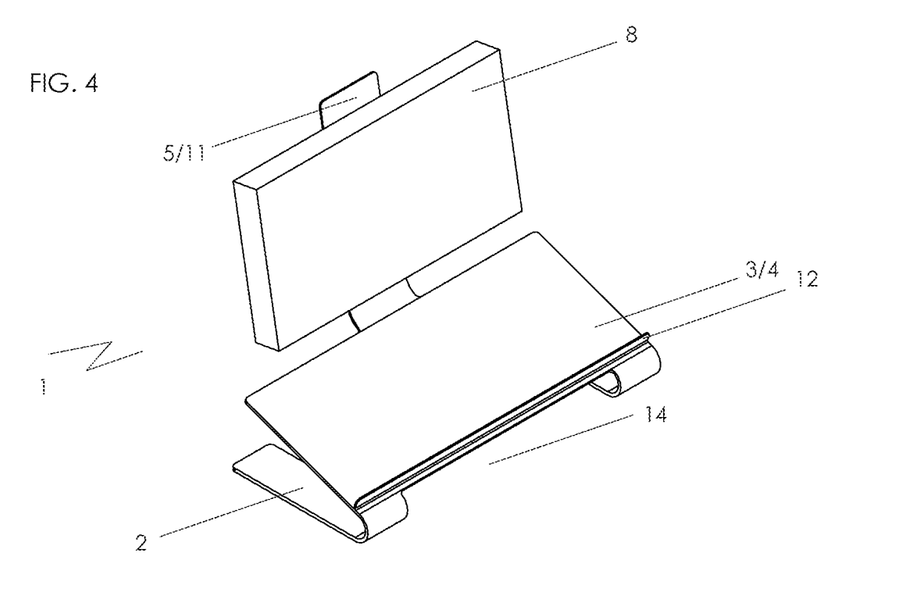
FIG. 4 shows a schematic perspective view of a fourth embodiment of an accessory support device according to the present disclosure.

FIG. 4 shows a fourth embodiment of an accessory support device 1 in accordance with the present disclosure. The accessory support device 1, wherein the upright portion 5 comprises an upright member 11 having an upright member width that is substantially less than the inclined portion width, and wherein the upright portion 5 carries a flat panel monitor 8 having a flat panel monitor width such that the upright member 11 and the flat panel monitor 8 carried thereon together form a privacy panel 6 having a privacy panel width that at least corresponds to half of the inclined portion width, optionally at least to the inclined portion width.

Figure 5:
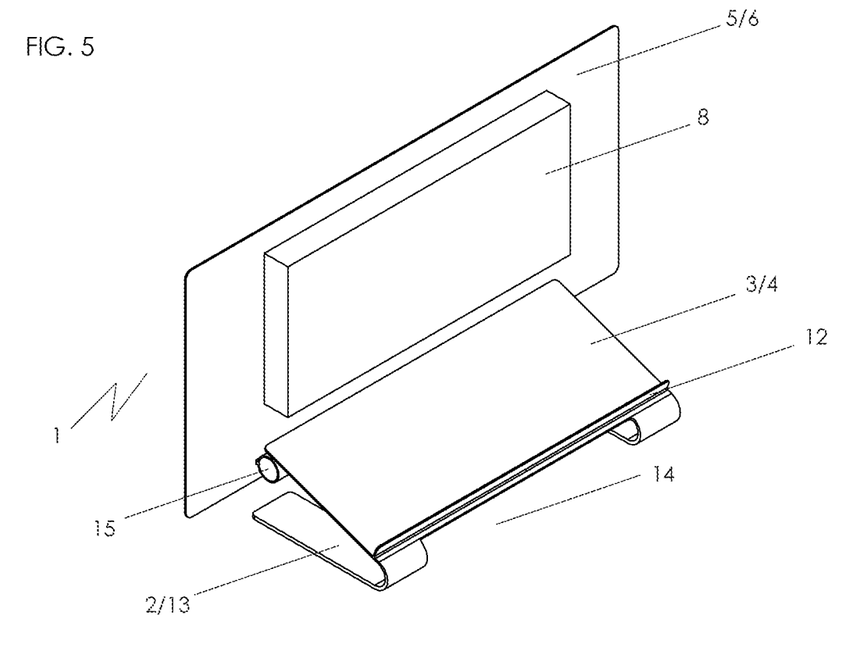
FIG. 5 shows a schematic perspective view of a fifth embodiment of an accessory support device according to the present disclosure.

FIG. 5 shows a fifth embodiment of an accessory support device 1 in accordance with the present disclosure. The accessory support device 1, wherein the upright portion 5 is angularly adjustably connected to the inclined portion 3, optionally to the base portion 13 or other portion of the support structure 2, preferably via a first hinge construction 15 about a first hinge construction axis. The upright portion 5 and the inclined portion 3 may fold in half and fold flat this way, i.e., they may fold parallel relative to one another.

Figure 6:
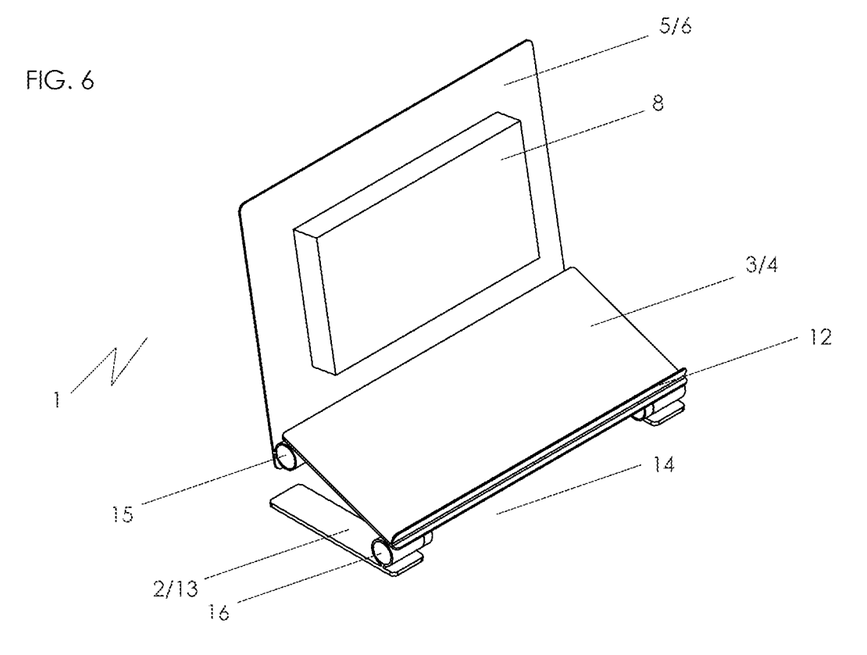
FIG. 6 shows a schematic perspective view of a sixth embodiment of an accessory support device according to the present disclosure.

FIG. 6 shows a sixth embodiment of an accessory support device 1 in accordance with the present disclosure. The accessory support device 1, wherein the inclined portion 3 is angularly adjustably connected to the base portion 13 or other portion of the support structure 2, preferably via a second hinge construction 21 about a second hinge construction axis. The first and second hinge constructions 15, 21 may also comprise bore and shaft members 16, 17 with corresponding teeth 18, or with friction hinges 19, torsion springs 20, or a combination of those. Alternatively, a simple bolt and nut construction may also be used. The inclined portion 3 and the base portion 13 may fold in half and fold flat this way, i.e., they may fold parallel relative to one another. The first hinge construction axis may extend in parallel to the second hinge construction axis.

Figure 7:
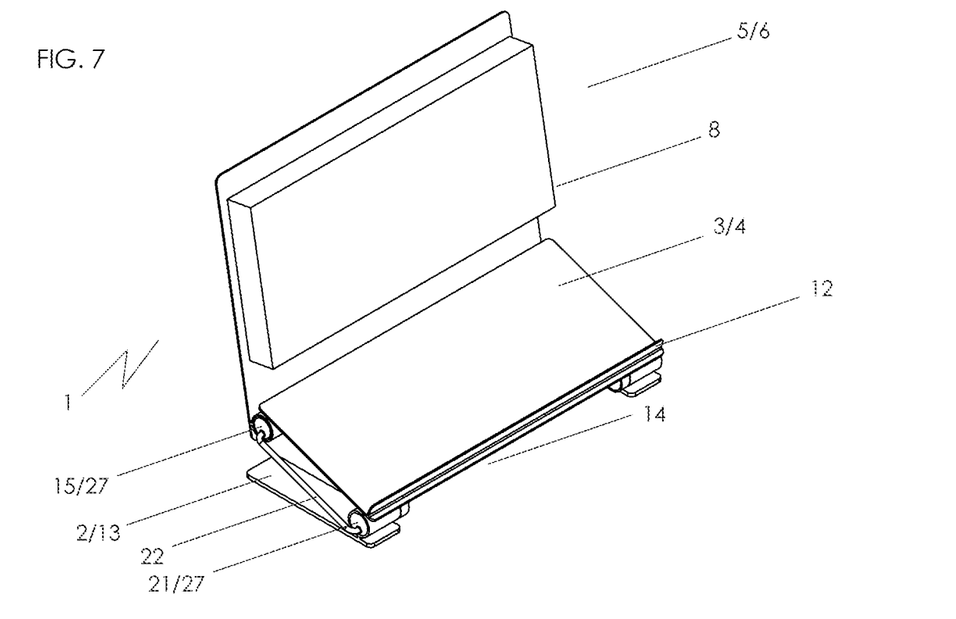
FIG. 7 shows a schematic perspective view of a seventh embodiment of an accessory support device according to the present disclosure.

FIG. 7 shows a seventh embodiment of an accessory support device 1 in accordance with the present disclosure. The accessory support device 1, wherein the first and second hinge constructions 15, 21 are coupled via an angle compensation device 22, optionally a parallelogram mechanism, to compensate the first hinge construction 15 for angular adjustment of the second hinge construction 21 so as to keep the angle of the upright portion 5 relative to the base plane mainly unchanged when the angle of the inclined portion 3 relative to the base plane is adjusted. The shaft member 17 of the first hinge construction 15 may comprise interspaced teeth portions 23, or may comprise basic male and female friction members 24, 25 which may be fitted with an extra friction sleeve 26 to create independent friction from the male and female friction members 24, 25 for independent angular adjustment. The first or second hinge constructions 16, 21, or both, may comprise friction hinges 19 and torsion springs 20 acting as a balancing force device 27.

Figure 8:
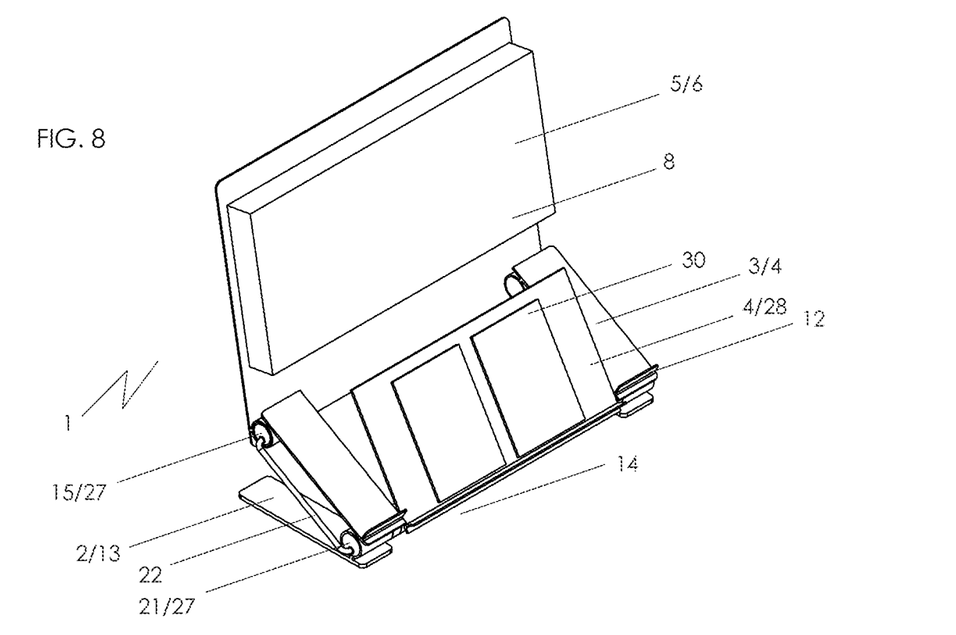
FIG. 8 shows a schematic perspective view of an eight embodiment of an accessory support device according to the present disclosure.

FIG. 8 shows a eight embodiment of an accessory support device 1 in accordance with the present disclosure. The accessory support device 1, wherein the inclined portion 3 includes a movable part 28, the movable part 28 optionally including at least a part of the accessory support surface 4, and the movable part 28 optionally being connected to the inclined portion 3 via a third hinge construction 29 so as to be independently angularly adjustable relative to the inclined portion 3. The shaft member 17 of the second and third hinge constructions 21, 29 may also comprise interspaced teeth portions 23, or may also comprise basic male and female friction members 24, 25 which may also be fitted with an extra friction sleeve 26 to create independent friction from the male and female friction members 24, 25 for independent angular adjustment. The inclined portion width, and in particular the width of the accessory support surface 4, at least corresponds to a width of a sheet of standard A4 or Legal sized office paper 30 in portrait orientation.

Figure 9:
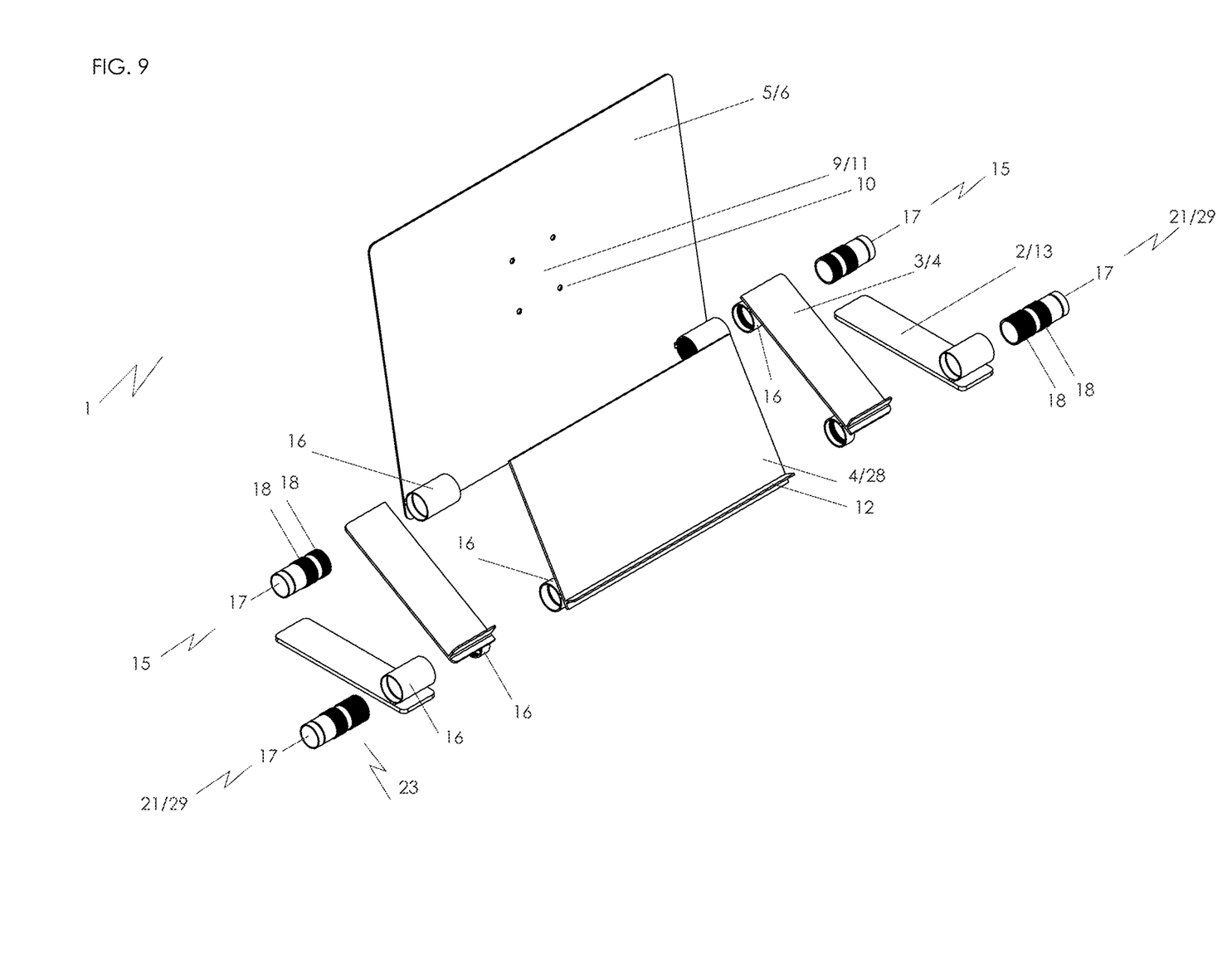
FIG. 9 shows a first exploded view of an embodiment of an accessory support device according to the present disclosure.

FIG. 9 shows a first exploded view of an embodiment of an accessory support device 1 in accordance with the present disclosure.

Figure 10:
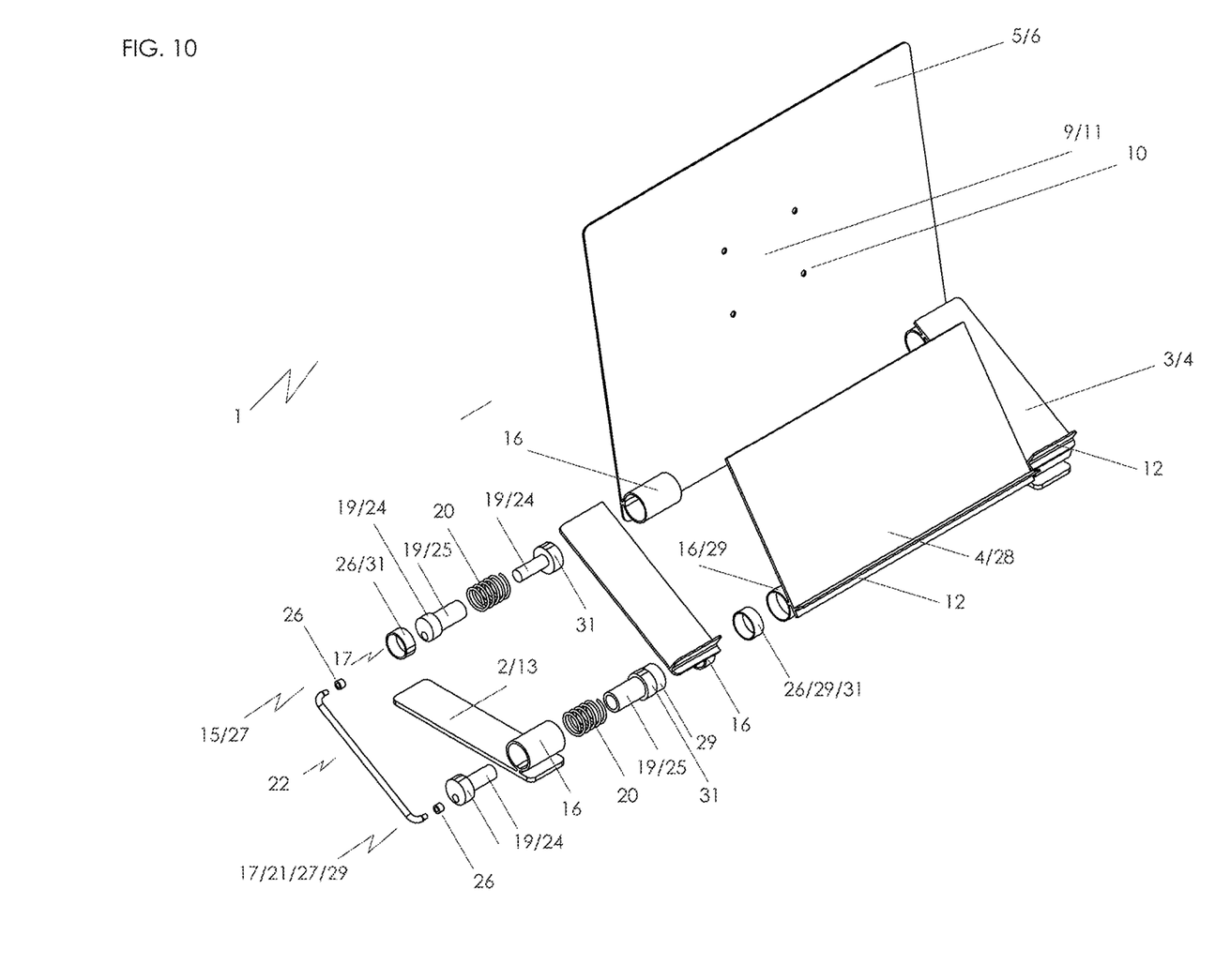
FIG. 10 shows a second exploded view of an embodiment of an accessory support device according to the present disclosure.

FIG. 10 shows a second (partially) exploded view of an embodiment of an accessory support device 1 in accordance with the present disclosure. Advantageously, the hinge constructions comprise hinge members with means for preventing the rotation of the hinge members, e.g. circumferential knurled surfaces 31 and means for correct positioning, e.g. flats, in the hinge constructions.

These and other embodiments will be apparent to the person skilled in the art and are considered to lie within the scope of the present disclosure as defined by the following claims.

The invention claimed is:

1. An accessory support device for supporting an electronic device, comprising:
   a support structure that defines a flat base plane;
   an inclined portion that is supported on the support structure and that has an inclined portion width and that extends in an inclined plane upward relative to the base plane along an inclined portion length from a front of the accessory support device facing a user to a rear of the accessory support device located further away from the user, the inclined portion including an accessory support surface extending at a first viewing angle for the user; and
   an upright portion that is supported on the inclined portion and that has an upright portion width and that extends in a mainly upright plane relative to the base plane along an upright portion length from the rear of the accessory support device at a second viewing angle for the user, so as to form a privacy panel that shields the user from being seen from the rear of the accessory support device;
   wherein the upright portion is angularly adjustably connected to the inclined portion, via a first hinge construction,
   wherein the inclined portion is angularly adjustably connected to the support structure, via a second hinge construction,
   wherein the first and second hinge constructions are coupled via an angle compensation device to compensate the first hinge construction for angular adjustment of the second hinge construction so as to keep the angle of the upright portion relative to the base plane mainly unchanged when the angle of the inclined portion relative to the base plane is adjusted.

2. The accessory support device according to claim 1, wherein the upright portion length at least corresponds to the inclined portion length.

3. The accessory support device according to claim 1, wherein the upright portion width at least corresponds to the inclined portion width.

4. The accessory support device according to claim 1, wherein the upright portion comprises a connector portion arranged to support a flat panel monitor, via connector elements provided at the upright portion.

5. The accessory support device according to claim 1, wherein the upright portion comprises an upright member having an upright member length that is substantially less than the inclined portion length, and wherein the upright portion carries a flat panel monitor having a flat panel monitor length such that the upright member and the flat panel monitor carried thereon together form a privacy panel having a privacy panel length that at least corresponds to half of the inclined portion length, optionally at least to the inclined portion length.

6. The accessory support device according to claim 1, wherein the upright portion comprises an upright member having an upright member width that is substantially less than the inclined portion width, and wherein the upright portion carries a flat panel monitor having a flat panel monitor width such that the upright member and the flat panel monitor carried thereon together form a privacy panel having a privacy panel width that at least corresponds to half of the inclined portion width, optionally at least to the inclined portion width.

7. The accessory support device according to claim 1, wherein the inclined portion length, and in particular a length of the accessory support surface, at least corresponds to a length of a sheet of standard A4 or Legal sized office paper in portrait orientation.

8. The accessory support device according to claim 1, wherein the inclined portion width, and in particular a width of the accessory support surface, at least corresponds to a width of a sheet of standard A4 or Legal sized office paper in portrait orientation.

9. The accessory support device according to claim 1, wherein the inclined portion, and in particular the accessory support surface thereof, includes a ledge portion extending transversely to the accessory support surface near the front of the accessory support device to stop an accessory supported on the inclined portion, in particular on the accessory support surface thereof, from sliding down.

10. The accessory support device according to claim 1, wherein the support structure includes a planar base portion that has a base portion width and that extends along a base portion length from the rear of the accessory support device to the front of the accessory support device.

11. The accessory support device according to claim 1, wherein the support structure is provided with a central opening at the front of the accessory support device that provides access to a storage area located underneath the inclined portion.

12. The accessory support device according to claim 1, wherein the upright portion is angularly adjustable relative to the base plane independently from angular adjustment of the inclined portion relative to the base plane.

13. The accessory support device according to claim 1, comprising a balancing force device acting between the support structure and the inclined portion.

14. The accessory support device according to claim 1, wherein provisions for angular adjustment of the upright portion relative to the base plane are located between the user and a side of the privacy panel facing the user.

15. The accessory support device according to claim 1, wherein provisions for angular adjustment of the inclined portion relative to the base plane are located between the user and a side of the privacy panel facing the user.

16. The accessory support device according to claim 1, wherein the inclined portion includes a movable part, the movable part optionally including at least a part of the accessory support surface, and the movable part optionally being connected to the inclined portion via a third hinge construction so as to be independently angularly adjustable relative to the inclined portion.

\* \* \* \* \*